United States Patent
Neuman

(10) Patent No.: US 6,690,355 B2
(45) Date of Patent: Feb. 10, 2004

(54) COMPUTER INPUT DEVICE

(76) Inventor: Eli Neuman, P.O. Box 4331, 13 Tarshish St., Cluster II, Caesarea (IL), 38900

(*) Notice: Subject to any disclaimer, the term of this patent is extended or adjusted under 35 U.S.C. 154(b) by 155 days.

(21) Appl. No.: 10/049,430

(22) PCT Filed: Jan. 24, 2001

(86) PCT No.: PCT/IL01/00066

§ 371 (c)(1),
(2), (4) Date: Feb. 12, 2002

(87) PCT Pub. No.: WO01/57840

PCT Pub. Date: Aug. 9, 2001

(65) Prior Publication Data

US 2003/0103033 A1 Jun. 5, 2003

(30) Foreign Application Priority Data

Feb. 3, 2000 (IL) .................................. 134351

(51) Int. Cl.⁷ .............................................. G09G 5/00
(52) U.S. Cl. ..................................... 345/156; 345/168
(58) Field of Search ................................ 345/156, 157, 345/160, 168, 172, 173

(56) References Cited

U.S. PATENT DOCUMENTS 4,823,634 A * 4/1989 Culver .................. 74/471 XY
6,256,011 B1 * 7/2001 Culver ........................ 345/157

* cited by examiner

Primary Examiner—Amare Mengistu
Assistant Examiner—Jimmy H. Nguyen

(57) ABSTRACT

A computer input device consists of a long and slender, pencil like, cylinder which is horizontally and rotatably disposed on two supports at both its ends. A finger touching the cylinder applies a force on it which is countered by reactions at the supports. These reactions are sensed by force sensors and the ratio between them is used to calculate the position of the finger along the cylinder. This position is the "X" input of the device. The same finger can rotate the cylinder around itself in both directions. The angular position of the cylinder is measured by a rotary sensor and is then used as the second, "Y", input.

7 Claims, 1 Drawing Sheet

COMPUTER INPUT DEVICE

BACKGROUND OF THE INVENTION

1. Field of the Invention

The present invention relates to computer input devices also known as computer pointing devices or 'mouse'.

2. Description of Related Art

A Mouse is a well recognized input device for computers. Its function is mainly to transfer to the computer instructions of desired position for the cursor and/or movement direction for same. A typical mouse consists of a ball which rolls on a surface on which the mouse is being dragged; the rolling movement of the ball is separated into two components, x and y, which are then sensed by two separate rotation sensors.

Mouse devices are efficient and convenient most of the time. There is, however, a disadvantage in the need to continuously change position of hands from the mouse to the keyboard and back. Also, mouse or other input devices cannot easily be integrated into keyboards, which feature is desirable in notebook computers.

SUMMARY OF THE INVENTION

An object of the present invention is to provide a computer input device capable of being integrated into a keyboard without a major change in the layout or design of said keyboard. Another object is to provide a computer input device which although alternatively not integrated into a keyboard, it can be used with minimal amount of hands movement from said device to the keyboard and vice versa.

These and other objects and advantages are achieved in accordance with the present invention by a device comprising a relatively thin and long cylinder installed rotateably on a shaft which in turn is supported on its two ends on resilient supports. The supports are fitted with deflection sensors on both ends. The cylinder itself is fitted with a rotary angle sensors. The device has the general length and width of a typical keyboard space bar and thus can, with some design changes, be installed in a keyboard instead of the space bar. An alternative use of the present invention is alongside and next to the spacebar but not in the keyboard but close to it. This arrangement enables convenient use of both keyboard and input device without excessive hand movements.

A finger is used to perform two simultaneous actions: rotate the cylinder, providing an 'x' input, and push it downward at a certain longitudinal position of the cylinder, which position is interpreted by the computer as 'y' input.

DETAILED DESCRIPTION OF THE PREFERRED EMBODIMENT

Figure 1:
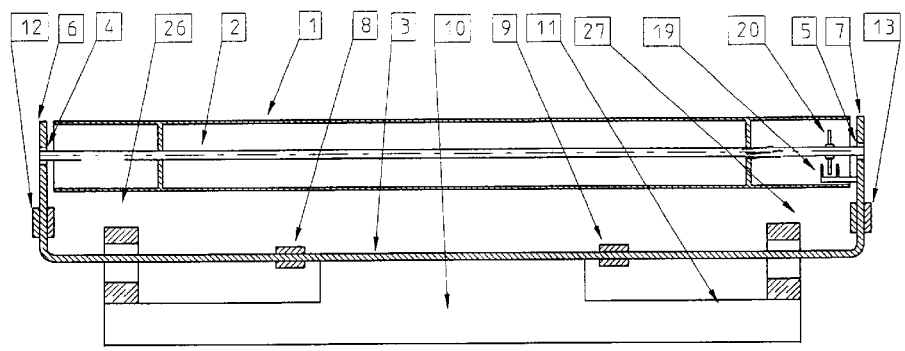
FIG. 1 is a schematic cross section through the length of the device in its free position, without any finger load on it.

FIG. 1 depicts a longitudinal cross section of the device. 1 is an elongated cylinder which its central shaft 2 is rotateably supported through bearings 4 and 5 on two vertical members 6 and 7. A fixed part 19 of a rotary angle sensor 26 is attached to vertical member 7 while a moving part 20 of same rotary angle sensor is attached to the inner surface of said cylinder such that when rotating, said rotary sensor 26 detects the angular movement of cylinder 1. This angular movement is one of the two outputs from the device, which for convenience will be referred to henceforth as output 'y'. Vertical members 6 and 7 are connected to horizontal member 3. The three members 6, 7, and 3 are made of a resilient material. Horizontal member 3 is supported in its center on a base 10 and 11, while its two unsupported ends are adapted to deflect downward under the influence of vertical forces transmitted via vertical members 6 and 7. At the same time member 3 is made much more rigid against deflection in other directions, for example by being designed as a flat relatively thin strip of material like metal or plastics.

Figure 2:
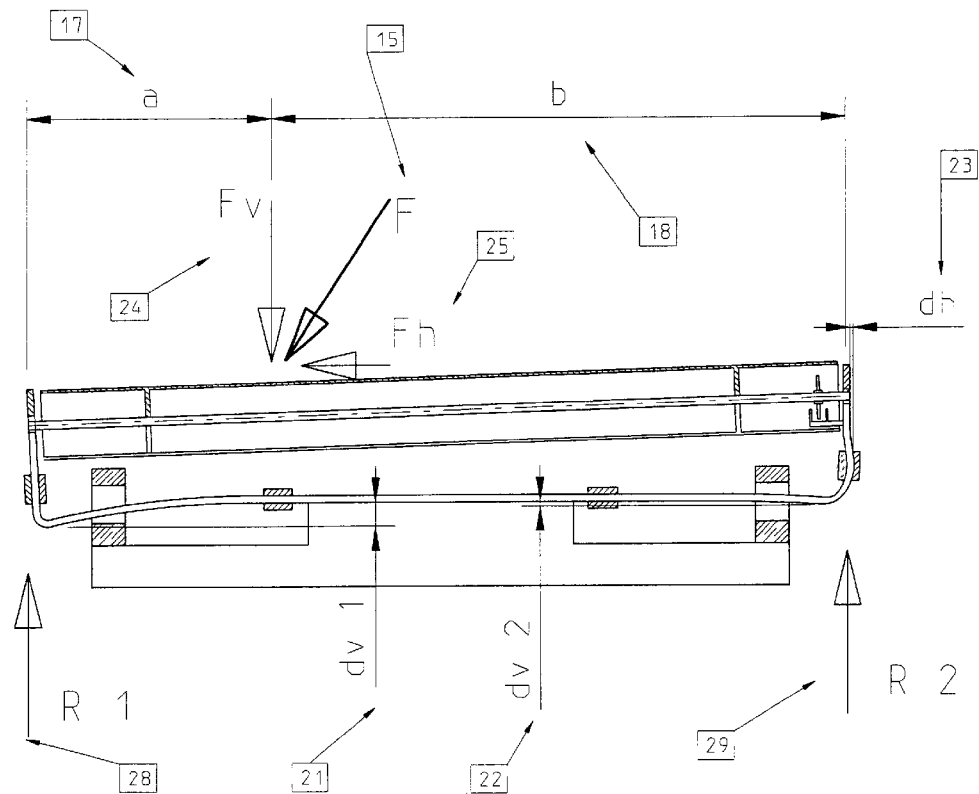
FIG. 2 is a cross section of the device with a load applied at a certain position.

Similarly, members 6 and 7 have their main flexibility designed to be in right and left directions as seen in FIG. 2.

Load or deflection sensors 12, 8, 9, and 13 are attached to members 6, 3, and 7, respectively. Such sensors can be based on strain gage techniques or other methods. Restraining members 26 and 27 are designed to prevent excessive deflection in both vertical and horizontal directions.

In operation, the user places a finger or another part of a hand on a certain location on cylinder 1, for example a location depicted in FIG. 2 as 15. The user turns the cylinder in one of two directions 14, thus changing output 'y' to the desired value. At the same time, finger pressure F, 15 in FIG. 2, which is used to rotate the cylinder, consists of a vertical component Fv, 24 in FIG. 2, and a horizontal component Fh, 25 in same FIG. Fv is transmitted to member 3 through vertical members 6 and 7. There are two reaction forces to Fv, seen in FIG. 2 as R1 and R2, 28 and 29. These reactions are applied on vertical members 6 and 7 through both ends of horizontal member 3. As a result, deflections dv1 and dv2, numbers 21 and 22, reflect each the size of the reaction R1 and R2 respectively, and are subsequently measured by sensors 8 and 9. From basic mechanics, a relation exists as follows:

$$a=(a+b)*R2/(R1+R2)$$

since a+b is the total length of the cylinder, it is known. R1 and R2 are measured by sensors 8 and 9 as already discussed. It is therefore possible to calculate 'a'—the position of the finger, and this 'a' becomes the second output from the device, to be referred to as 'x' hereafter. If now the user wishes to change output 'x', he or she will move the finger to a different position.

Additional means to affect output 'x' is provided by sensors 12 and 13. Applying a horizontal force 25, Fh, on cylinder 1 places vertical members 6 and 7 under moment and thus creates a deflection 23, dh, of said members, in this example to the left. This deflection is measured by sensors 12 and 13, and a value proportional to the horizontal force component is calculated. A typical schematic representation of a situation where both vertical and horizontal forces are applied is depicted in FIG. 2. Exaggerated deflections are shown for clarity.

The use of the above mentioned additional means is optional in the initial design of the device where it can be either included, not included, or made to affect 'x' output in a certain proportion relative to the value which is achieved by sensors 8 and 9. Still yet, in the design of the device only the output from sensors 12 and 13 can be used, thus abandoning the calculation of position 'a' of the force, and using for output 'x' only commands for left and right as measured by sensors 12 and 13. Such output then consists of a direction and magnitude, accordingly affecting movement of the cursor in the related computer.

The constituency of output 'x' can also be left to decision by the user, which will have the option of including any of the two aforesaid sets of measurements in any desired proportion.

The computer input device of the present invention can have the general size and shape of a 'space bar' in a computer keyboard. Although necessarily cylindrical in its main part, as opposed to the rectangular shape of 'space bar', if the diameter and length of the device are similar to the width and length of the 'space bar', and the height of both is also similar, such a device can be designed to be integrated into computer keyboards. The user then can select between the two distinct functions—'space bar' function and input device function. Such selection can be effected by pushing a pre assigned key or handling the device itself in a specific way, such as hitting it twice etc. In its use as a 'space bar', any change in any of the two outputs of the device can be determined as 'space' signal.

An alternative design of the computer input device is still in the keyboard not instead of the 'space bar', rather alongside the latter and close to it. Such a design can be useful in notebook computers where the area of the keyboard is limited.

Still another alternative use of the device is as a separate device and not one that is integrated in the keyboard, much like the customary 'mouse'. Such a use can retain the benefits of good ergonomic efficiency when the device is placed alongside the keyboard and in parallel to the 'space bar'.

What is claimed is:

1. A computer input device comprising a horizontal cylinder rotateably mounted on two vertical members, one at each end; a horizontal member connected to said two vertical members under said cylinder at its own two ends, said horizontal member supported in its middle region by a relatively rigid base, while said two vertical members and said horizontal member are made of resilient material and are designed to provide flexibility in a particular direction as follows: along the axis of said cylinder for said vertical members and in the vertical direction for said horizontal member, such that when a force is applied on said cylinder at a certain location along its axis, the vertical component of said force will induce vertical deflection in both ends of said horizontal member relative to its supported center and which deflection at one end not necessarily equal to that in the other, and the horizontal component of said force will induce horizontal deflection in both vertical said members; a rotary movement sensor disposed between said cylinder and its support, designed to provide information about the direction of said cylinder's rotation and the magnitude of such rotation; deflection sensors mounted on said vertical members and said horizontal member in its two deflectable sides; computing means adapted to accept inputs from said rotary sensor and deflection sensors and to convert them into two distinct outputs in a format which is appropriate for input into computers, out of which said two outputs one represents rotation of said cylinder while the other represents the location of said force along the axis of said cylinder as calculated by the relative size of the reaction in said two vertical members to said force, which reaction being measured by said deflection sensors on said ends of said horizontal member; and, restraining means to limit said deflection under excessive forces in order to protect said computer input device.

2. The computer input device as in claim 1, wherein said second output is not the location of said force acting along said cylinder's axis but the direction and size of the horizontal component of said force as measured by said deflection sensors that are adapted to sense the deflection of said vertical members.

3. The computer input device as in claims 1 or 2 wherein said second output is a user selectable mix between said calculated location of said force and size and direction of said horizontal component of said force.

4. The computer input device as in any of the claims 1 and 2 wherein its size and dimensional proportions are generally like that of a 'space bar' key in a computer keyboard such that said device can be designed to be integrated in computer keyboards instead of said 'space bar'.

5. The computer input device as in claims 1 or 2 wherein its size and dimensional proportions are generally like that of a 'space bar' key in a computer keyboard such that said device can be designed to be integrated in computer keyboards alongside existing 'space bar' and not instead of same.

6. The computer input device as in any of the claims 1 and 2 wherein said deflection sensors are strain gage devices bonded to said vertical and horizontal members.

7. The computer input device as in claim 1 wherein there is no calculation of position along the axis of said cylinder to provide one of the inputs; rather, a movement only is imparted to the cursor, direction of said movement is towards that cylinder end with the higher reaction force, and velocity of said movement is proportional to either the ratio of both reaction forces or the difference between said two reaction forces; and in which computer input device the movement of said cursor stops when there are no more reaction forces detected.

* * * * *